Feb. 27, 1940.  A. Y. DODGE  2,191,609
TRANSMISSION
Filed July 6, 1937    4 Sheets-Sheet 1
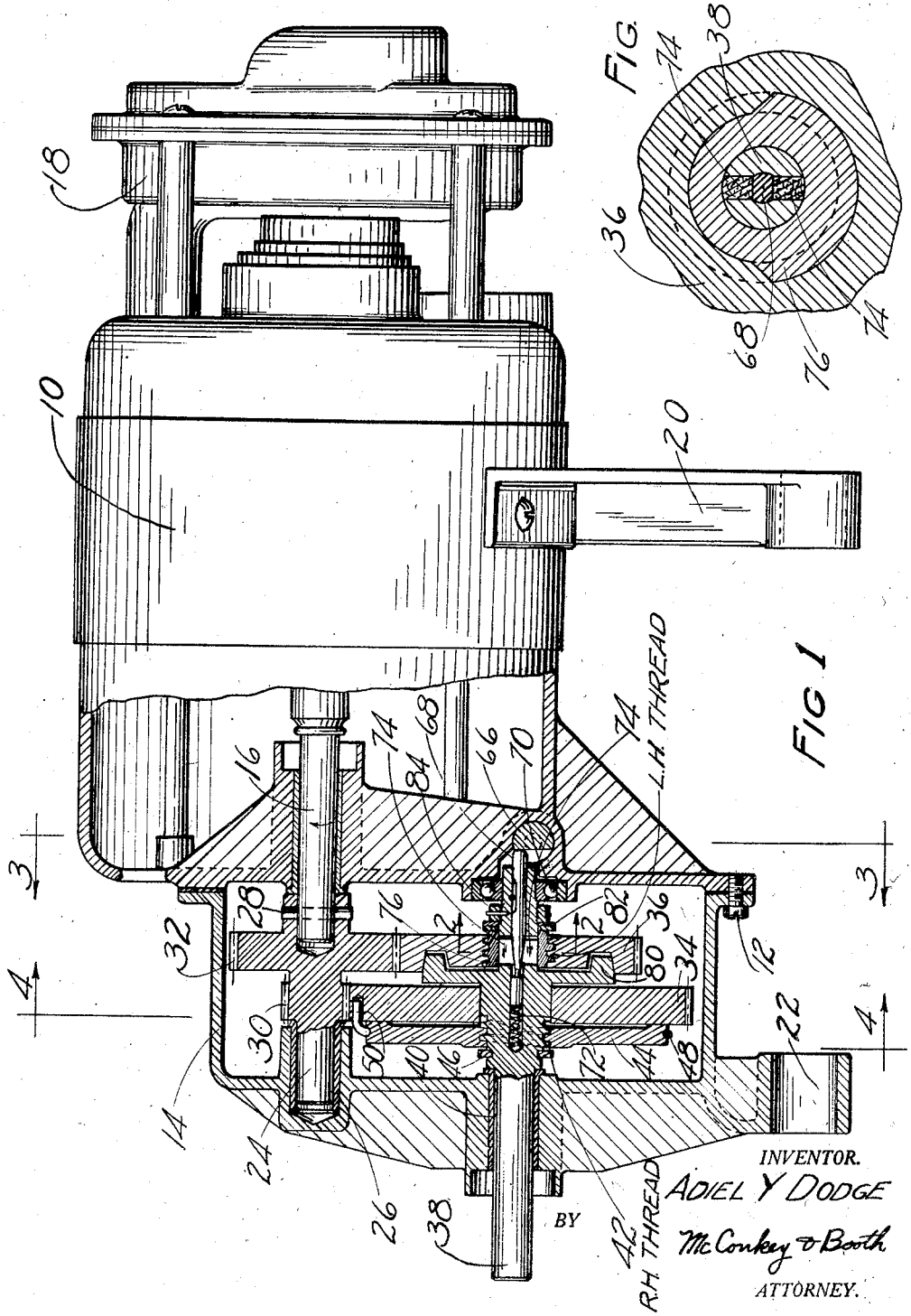
INVENTOR.
ADIEL Y DODGE
BY McConkey & Booth
ATTORNEY.

Feb. 27, 1940.   A. Y. DODGE   2,191,609
TRANSMISSION
Filed July 6, 1937   4 Sheets-Sheet 2

INVENTOR.
ADIEL Y. DODGE
BY McConkey & Booth
ATTORNEY.

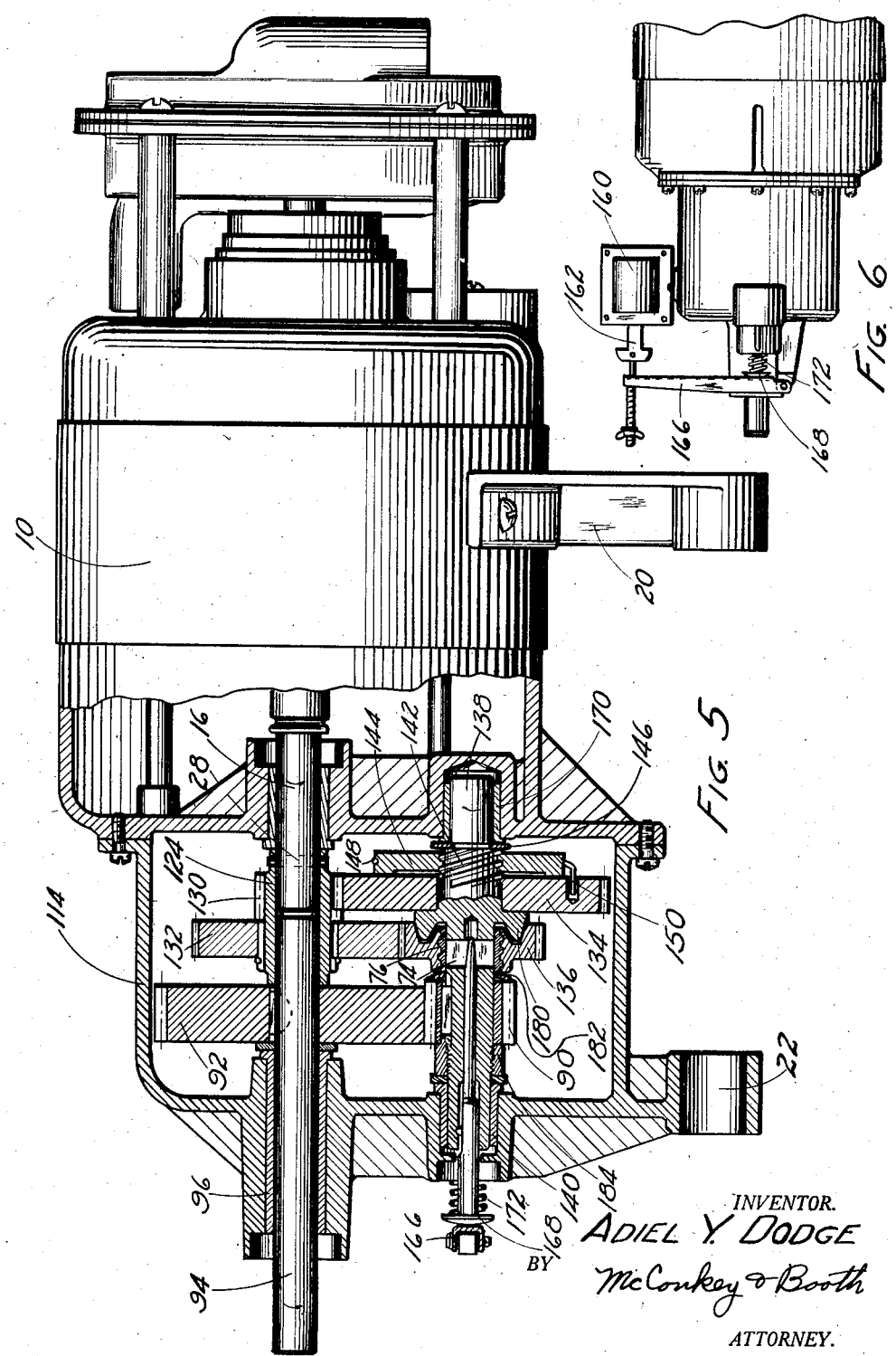

Feb. 27, 1940.　　A. Y. DODGE　　2,191,609
TRANSMISSION
Filed July 6, 1937　　4 Sheets-Sheet 4
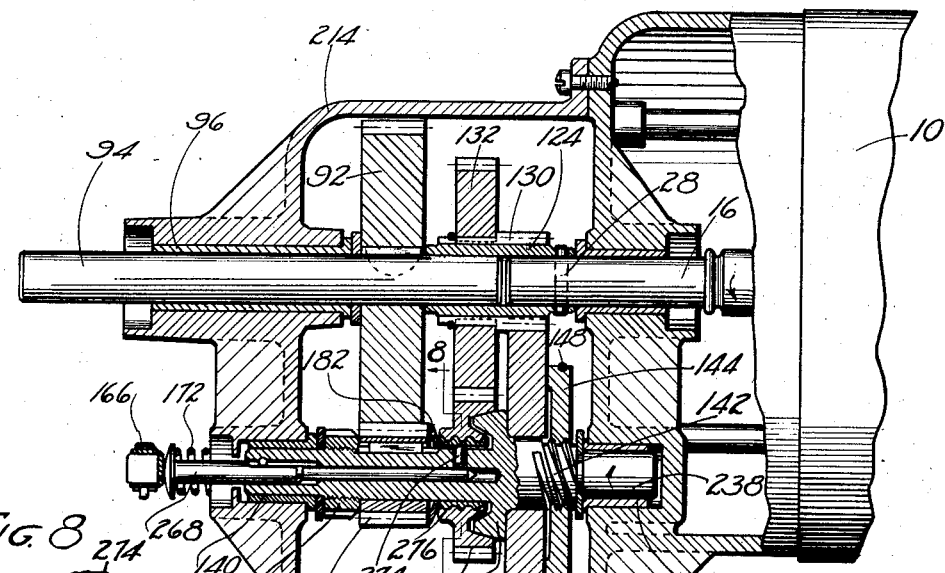
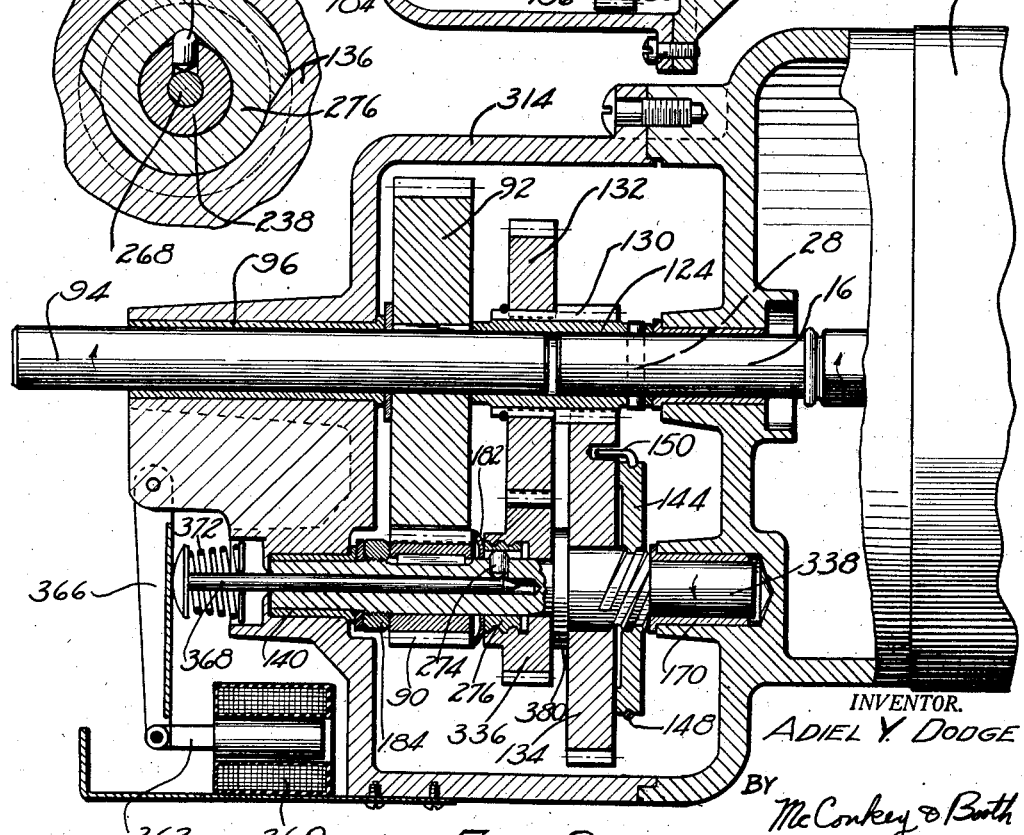
INVENTOR.
ADIEL Y. DODGE
BY McConkey & Booth
ATTORNEY.

Patented Feb. 27, 1940

2,191,609

UNITED STATES PATENT OFFICE 2,191,609

TRANSMISSION

Adiel Y. Dodge, South Bend, Ind., assignor to Bendix Home Appliances, Inc., Detroit, Mich., a corporation of Delaware Application July 6, 1937, Serial No. 152,057

17 Claims. (Cl. 74—368)

This invention relates to transmissions, and is illustrated as embodied in two-speed transmissions suitable for use in an automatic washing machine.

An object of the invention is to provide a compact and reliable transmission adapted for economical manufacture by mass production methods. Various features of novelty relate to the arrangement of the gears and of the means for selectively clutching different gears in effective driving connection with the transmission shaft, to give the desired compactness of arrangement, and to the association therewith of an improved speed-change control to insure the necessary certainty of operation.

These and other objects and features of the invention, including various particular arrangements and effective structures of the parts of the transmission, will be apparent from the following description of the illustrative embodiments shown in the accompanying drawings, in which:

Figure 1 is a plan view of a motor-transmission unit for an automatic washing machine, broken away in horizontal section through the transmission;

Figure 2 is a partial section on the line 2—2 of Figure 1, showing part of the speed-change control means;

Figure 3:
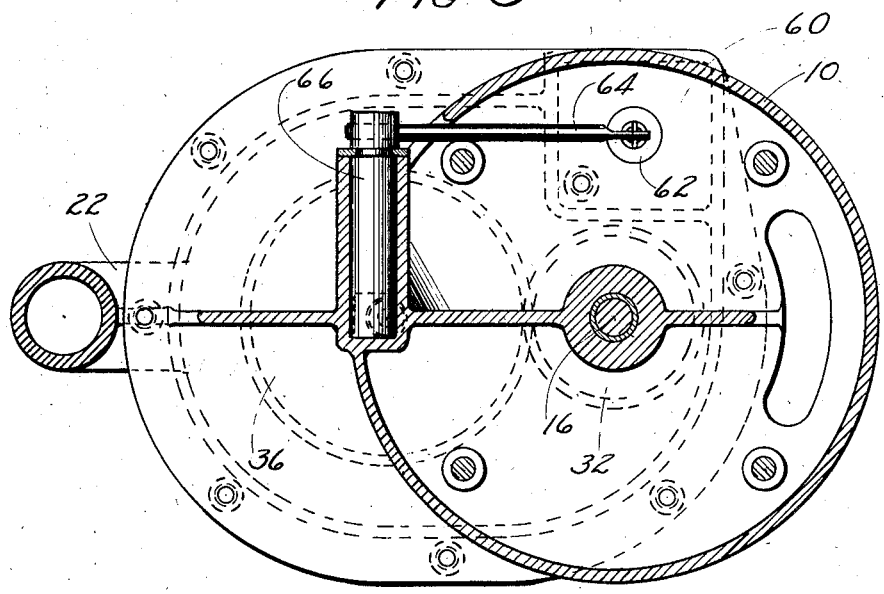
Figure 4:
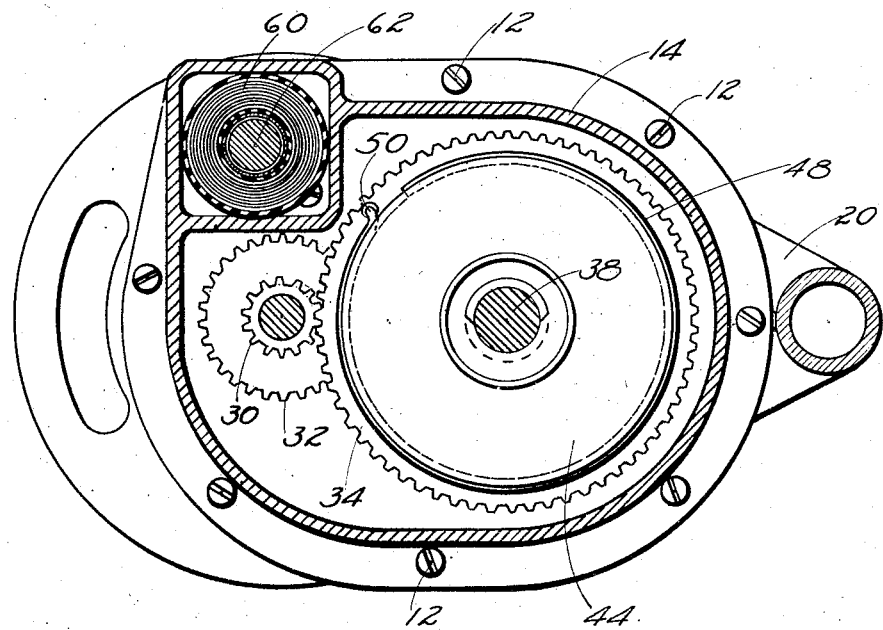

Figures 3 and 4 are vertical sections through the transmission, respectively on the lines 3—3 and 4—4 of Figure 1;

Figure 5 is a broken-away plan view corresponding to Figure 1, but showing a different transmission;

Figure 6 is a side elevation of the motor-transmission unit of Figure 5;

Figure 7 is a view corresponding to the left-hand portion of Figure 1 or Figure 5, but showing a third transmission;

Figure 8 is a partial section on the line 8—8 of Figure 7, showing part of the speed-change control means; and Figure 9 is a view similar to Figure 7 of a fourth transmission.

The different motor-transmission units illustrated are intended for use in the automatic washing machine described in application No. 129,429, filed March 6, 1937, by John W. Chamberlin and Rex Earl Bassett Jr., or in such a machine modified as described in my prior application No. 129,412, filed March 6, 1937, the unit preferably being mounted in the machine as described in application No. 136,359, filed April 12, 1937, by John W. Chamberlin and Kendall Clark.

The unit shown in Figures 1 to 4 includes a motor 10, to one end of the housing of which is secured by suitable fastenings 12 a housing 14 for the transmission described below. The armature shaft 16 of the motor projects at one end into the housing 14, and at its other end drives a suitable water pump 18 as described in the above-identified Bassett-Chamberlin application. The unit is provided with suitable lugs or brackets 20 and 22 for pivotally mounting it in the machine as described in the above-identified Chamberlin and Clark application.

A drive shaft 24, journaled at one end in a bearing 26 mounted in the housing 14 and recessed at its other end to telescope over the end of the armature shaft 16, is drivably connected to the armature shaft by means such as a transverse pin 28. This drive shaft is provided (integrally, in the form illustrated) with pinion teeth 30 forming a small-diameter gear, and with gear teeth 32 forming a larger-diameter gear.

The gears 30 and 32 mesh with, and drive continuously at different speeds, a large gear 34 and a smaller gear 36 loose on a counter-shaft 38. In this embodiment, one end of the counter-shaft 38 extends through the housing 14 (being journaled in a suitable bearing 40), and is provided with means (not shown) for drivably connecting it to the washing machine.

Immediately at the left of the large gear 34, the shaft 38 has a part formed with a coarse right-hand screw-thread 42, meshing with a corresponding thread formed interiorly of the hub of a clutch member or disk 44. A snap-ring 46 may be provided to limit movement of the clutch disk 44 to the left. The disk is peripherally formed with a groove for an encircling clutch spring 48 having a laterally-bent end 50 anchored in a recess in the adjacent side of the large gear 34. The spring 48 is anchored at one end and free at the other, and has a frictional engagement with the grooved surface of the disk 44; thus when the gear 34 turns in one direction relatively to the disk 44 the spring wraps about the disk and tends to turn it with the gear, thereby causing it to shift to clutch the gear and disk together, while when the gear turns in the other direction it has an unwrapping action on the spring and the spring slides idly on the periphery of the disk 44 but with sufficient drag to cause the disk to shift away from the gear.

It will be seen that this forms a powerful but sensitive one-way drive connection between the gear 34 and the shaft 38. When the transmission is in low, the drag of the spring 48 shifts the clutch disk 44 along the thread 42 against the adjacent face of the gear 34, effectively coupling gear 34 and disk 44 and shaft 38 to turn in unison; at this time gear 36 turns idly on the shaft 38.

When in high, as described below, the shaft 38 over-runs the gear 34 and the disk 44, causing the latter to unclutch itself from the gear and shift axially to the left as far as permitted by the stop 46. Thereafter the spring 48 merely drags idly on the periphery of the disk 44.

To secure high speed, a solenoid 60 is energized, causing its core 62 to pull on a lever 64 projecting from a rock-shaft 66 journaled in the motor housing. As shown in Figure 1, the shaft 66 has a cam surface operatively engaging the end of a clutch-operating member such as a plunger 68 movably axially in a recess in the motor end of the countershaft 38. This end of the countershaft is shown as reduced in size and journaled in a ball bearing 70 carried by the end face of the housing of the motor 10. The plunger 68 shifts against the resistance of a coil return spring 72 seated in the shaft recess.

The plunger 68 is formed with wedge or cam portions for shifting radially, in a slot formed transversely through the shaft 38, two clutch elements or shoes 74, which move outward to exert a frictional drag on a clutch part 76 sleeved on the shaft 38. The clutch part 76 is formed peripherally with a coarse lefthand thread meshing with a corresponding thread formed interiorly of the hub of the high-speed gear 36.

The drag of the clutch elements 74 holds back the clutch part 76, causing the gear 36 to shift axially to the left to bring a conically surfaced annular clutch groove in its side into frictional engagement with corresponding male clutch surfaces on a clutch member such as a flange 80 arranged between the gears 34 and 36, and shown as extending integrally from the shaft 38. This locks the gear 36 and the clutch member 80 and the shaft 38 all together, the shaft 38 over-running the gear 34 as previously described.

The clutch part 76 is shown confined between the radially-extending clutch member 80 and some washers 82 backed up by a threaded ring 84 locked to the shaft 38.

In Figures 5 and 6, parts which are the same as those in Figures 1–4 are designated by the same reference characters, and those which are more or less different in form but of corresponding function are designated by the same reference characters increased by 100.

One important difference between the two transmissions is that in the transmission of Figures 5 and 6 the counter-shaft 138 has keyed thereto a small gear or pinion 90 meshing with a large gear 92 keyed to a final driven shaft 94 in axial alinement with the armature shaft 16. The shaft 94 may have a suitable bearing 96 carried by the transmission housing 114. I prefer to make the drive shaft 124 hollow, telescoping it over the adjacent ends of the shafts 16 and 94 and drivably connected to the former by the pin 28. The gear 132 is illustrated as formed separately from the shaft 124 and keyed thereto.

This permits the clutch-controlling plunger 168 to project through the housing 114 at the other end of the shaft 138 from the motor 10, so that it may be shifted (against the resistance of its spring 172) by direct engagement with a gear-shift lever 166 yieldingly connected to the core 162 of the solenoid 160.

In this embodiment the clutch part 76 is confined between the clutch member 180 and a Belleville washer 182 backed up by the gear 86 which in turn is held in thrust relation by a threaded ring 184 secured on the shaft 138. A progressive clutching action is provided by the gradual compression of the resilient washer 182.

It is believed that the operation of this transmission will be clear from the description of the first transmission.

In Figures 7 and 8, parts which are the same as parts in any of the preceding figures are designated by the same reference characters as in those figures and those which are more or less different in form but of corresponding function are designated by the same reference characters increased by 200.

The principal difference between this and the preceding embodiments is that the plunger 268 is formed conically at its end for shifting radially, in a drilled hole formed radially of the shaft 238, a key or clutch element 274, which moves outward to positively engage a groove or depression 98 (see Figure 8) in the inner periphery of the clutch part 276. This locks the clutch part 276 to the shaft 238 so that it rotates relatively to the gear 136 and the threads on its outer periphery force the gear 136 into engagement with the clutch member 180, in the manner described with relation to the preceding embodiments and it is believed that the operation of this embodiment in other respects will be clear from the descriptions of the first and second transmissions'

In Figure 9, parts which are identical with parts in any of the preceding figures are designated by the same reference characters as in those figures and those which are more or less different in form but of corresponding function are designated by the same reference characters increased by 300.

This fourth transmission differs from the preceding three mainly in that the flange or clutch member 380 on the shaft 338 is provided only with plane clutch surfaces engaging corresponding surfaces on the gear 336 instead of the conical surfaces of the preceding transmissions.

The housing 314 and the positioning and form of the solenoid 360 and the clutch lever 366 are somewhat modified.

In other respects this transmission is similar to the one last preceding and it is believed its operation will be understood from the descriptions of the three transmissions previously described.

While several illustrative embodiments have been described in detail, it is not my intention to limit the scope of the invention to those particular embodiments, or otherwise than by the terms of the appended claims.

I claim:

1. A transmission comprising a counter-shaft having loosely mounted thereon large and small gears, a drive shaft having small and large gear devices meshing with and continuously driving respectively the large and small gears, a clutch member mounted on threads on the counter-shaft at the side of the large gear opposite the small gear and encircled by a clutch spring anchored to said large gear and shifted by the drag of said spring into clutching engagement with the side of said large gear during low speed drive and shifted away from the large gear when the counter-shaft over-runs the large gear during high speed drive, said counter-shaft being provided with a part sleeved thereon and having a thread directed oppositely to the first thread and on which said small gear is mounted and also being provided between said gears with a clutch member engaged by said small gear by shifting it on the second thread, a radially movable clutch element mounted in a slot in the counter-shaft and engageable with said threaded part, and an operating member movable lengthwise along the axis of the counter-shaft and having means to move the clutch element outward to cause the slowing up of the threaded part and consequent shifting of the small gear against the clutch member to give high speed drive.

2. A transmission comprising a counter-shaft having loosely mounted thereon large and small gears, a drive shaft having small and large gear devices meshing with and continuously driving respectively the large and small gears, one-way clutch means through which the large gear drives the counter-shaft during low speed drive and which releases the counter-shaft when the counter-shaft over-runs the large gear during high speed drive, said countershaft being provided with a part sleeved thereon and having a thread on which said small gear is mounted and also being provided between said gears with a clutch member engaged by said small gear by shifting it on said thread, a radially movable clutch element mounted in a slot in the counter-shaft and engageable with said threaded part, and an operating member movable lengthwise along the axis of the counter-shaft and having means to move the clutch element outward to cause the slowing up of the threaded part and consequent shifting of the small gear against the clutch member to give high speed drive.

3. A transmission comprising a counter-shaft having loosely mounted thereon large and small gears, a drive shaft having small and large gear devices meshing with and continuously driving respectively the large and small gears, a clutch member mounted on threads on the counter-shaft at the side of the large gear opposite the small gear and encircled by a clutch spring anchored to said large gear and shifted by the drag of said spring into clutching engagement with the side of said large gear during low speed drive and shifted away from the large gear when the counter-shaft over-runs the large gear during high speed drive, said countershaft being provided with a part sleeved thereon and having a thread directed oppositely to the first thread and on which said small gear is mounted and also being provided between said gears with a clutch member engaged by said small gear by shifting it on the second thread, a radially movable clutch element mounted in a slot in the counter-shaft and engageable with said threaded part, and an operating member movable lengthwise along the axis of the counter-shaft and having means to move the clutch element outward to cause the slowing up of the threaded part and consequent shifting of the small gear against the clutch member to give high speed drive, said transmission having a final driven shaft axially alined with said drive shaft and drivably connected to the counter-shaft through gear reduction means.

4. A transmission comprising a counter-shaft having loosely mounted thereon large and small gears, a drive shaft having small and large gear devices meshing with and continuously driving respectively the large and small gears, one-way clutch means through which the large gear drives the counter-shaft during low speed drive and which releases the counter-shaft when the counter-shaft over-runs the large gear during high speed drive, said countershaft being provided with a part sleeved thereon and having a thread on which said small gear is mounted and also being provided between said gears with a clutch member engaged by said small gear by shifting it on said thread, a radially movable clutch element mounted in a slot in the countershaft and engageable with said threaded part, and an operating member movable lengthwise along the axis of the counters-haft and having means to move the clutch element outward to cause the slowing up of the threaded part and consequent shifting of the small gear against the clutch member to give high speed drive, said transmission having a final driven shaft axially alined with said drive shaft and drivably connected to the counter-shaft through gear reduction means.

5. A transmission comprising a counter-shaft having loosely mounted thereon large and small gears, a drive shaft having small and large gear devices meshing with and continuously driving respectively the large and small gears, a clutch member mounted on threads on the counter-shaft at the side of the large gear opposite the small gear and encircled by a clutch spring anchored to said large gear and shifted by the drag of said spring into clutching engagement with the side of said large gear during low speed drive and shifted away from the large gear when the counter-shaft over-runs the large gear during high speed drive, said countershaft being provided with a part sleeved thereon and having a thread directed oppositely to the first thread and on which said small gear is mounted and also being provided between said gears with a clutch member engaged by said small gear by shifting it on the second thread, a radially movable clutch element mounted in a slot in the counter-shaft and engageable with said threaded part, and an operating member movable lengthwise along the axis of the counter-shaft and having means to move the clutch element outward to cause the slowing up of the threaded part and consequent shifting of the small gear against the clutch member to give high speed drive, in combination with a motor having a transmission housing secured to its end and serving with the end of the motor to house the drive shaft and the counter-shaft and the parts mounted thereon, said motor having an armature shaft axially alined with and drivably connected to said drive shaft.

6. A transmission comprising a counter-shaft having loosely mounted thereon large and small gears, a drive shaft having small and large gear devices meshing with and continuously driving respectively the large and small gears, one-way clutch means through which the large gear drives the counter-shaft during low speed drive and which releases the counter-shaft when the counter-shaft over-runs the large gear during high speed drive, said countershaft being provided with a part sleeved thereon and having a thread on which said small gear is mounted and also being provided between said gears with a clutch member engaged by said small gear by shifting it on said thread, a radially movable clutch element mounted in a slot in the counter-shaft and engageable with said threaded part, and an operating member movable lengthwise along the axis of the counter-shaft and having means to move the clutch element outward to cause the slowing up of the threaded part and consequent shifting of the small gear against the clutch member to give high speed drive, in combination with a motor having a transmission housing secured to its end and serving with the end of the motor to house the drive shaft and the counter-shaft and the parts mounted thereon, said motor having an armature shaft axially alined with and drivably connected to said drive shaft.

7. A transmission comprising a counter-shaft having loosely mounted thereon large and small gears, a drive shaft having small and large gear devices meshing with and continuously driving respectively the large and small gears, one-way clutch means through which the large gear drives the counter-shaft during low speed drive and which releases the counter-shaft when the counter-shaft over-runs the large gear during high speed drive, said countershaft being provided with a part sleeved thereon and having a thread on which said small gear is mounted and also being provided between said gears with a clutch member engaged by said small gear by shifting it on said thread, a radially movable clutch element mounted in a slot in the counter-shaft and engageable with said threaded part, and an operating member movable lengthwise along the axis of the counter-shaft and having means to move the clutch element outward to cause the slowing up of the threaded part and consequent shifting of the small gear against the clutch member to give high speed drive, in combination with a motor having a transmission housing secured to its end and serving with the end of the motor to house the drive shaft and the counter-shaft and the parts mounted thereon, said motor having an armature shaft axially alined with and drivably connected to said drive shaft, said counter-shaft having one end projecting through said transmission housing for connection with a machine to be driven and having at its other end a bearing in said end of the motor.

8. A transmission comprising a counter-shaft having loosely mounted thereon large and small gears, a drive shaft having small and large gear devices meshing with and continuously driving respectively the large and small gears, one-way clutch means through which the large gear drives the counter-shaft during low speed drive and which releases the counter-shaft when the counter-shaft over-runs the large gear during high speed drive, said countershaft being provided with a part sleeved thereon and having a thread on which said small gear is mounted and also being provided between said gears with a clutch member engaged by said small gear by shifting it on said thread, a radially movable clutch element mounted in a slot in the counter-shaft and engageable with said threaded part, and an operating member movable lengthwise along the axis of the counter-shaft and having means to move the clutch element outward to cause the slowing up of the threaded part and consequent shifting of the small gear against the clutch member to give high speed drive, in combination with a motor having a transmission housing secured to its end and serving with the end of the motor to house the drive shaft and the counter-shaft and the parts mounted thereon, said motor having an armature shaft axially alined with and drivably connected to said drive shaft, said counter-shaft having one end projecting through said transmission housing for connection with a machine to be driven and having at its other end a bearing in said end of the motor and said end of the motor having journaled therein a shaft having cam means for lifting said operating member axially of the counter-shaft.

9. A transmission comprising a counter-shaft having loosely mounted thereon large and small gears, a drive shaft having small and large gear devices meshing with and continuously driving respectively the large and small gears, one-way clutch means through which the large gear drives the counter-shaft during low speed drive and which releases the counter-shaft when the counter-shaft over-runs the large gear during high speed drive, said countershaft being provided with a part sleeved thereon and having a thread on which said small gear is mounted and also being provided between said gears with a clutch member engaged by said small gear by shifting it on said thread, a radially movable clutch element mounted in a slot in the countershaft and engageable with said threaded part, and an operating member movable lengthwise along the axis of the counter-shaft and having means to move the clutch element outward to cause the slowing up of the threaded part and consequent shifting of the small gear against the clutch member to give high speed drive, said transmission having a final driven shaft axially alined with said drive shaft and drivably connected to the counter-shaft through gear reduction means, in combination with a motor having a transmission housing secured to its end and serving with the end of the motor to house the drive shaft and the counter-shaft and the parts mounted thereon, said motor having an armature shaft axially alined with and drivably connected to said drive shaft.

10. A transmission comprising a counter-shaft having loosely mounted thereon large and small gears, a drive shaft having small and large gear devices meshing with and continuously driving respectively the large and small gears, one-way clutch means through which the large gear drives the counter-shaft during low speed drive and which releases the counter-shaft when the counter-shaft over-runs the large gear during high speed drive, said countershaft being provided with a part sleeved thereon and having a thread on which said small gear is mounted and also being provided between said gears with a clutch member engaged by said small gear by shifting it on said thread, a radially movable clutch element mounted in a slot in the countershaft and engageable with said threaded part, and an operating member movable lengthwise along the axis of the counter-shaft and having means to move the clutch element outward to cause the slowing up of the threaded part and consequent shifting of the small gear against the clutch member to give high speed drive, said transmission having a final driven shaft axially alined with said drive shaft and drivably connected to the counter-shaft through gear reduction means, in combination with a motor having a transmission housing secured to its end and serving with the end of the motor to house the drive shaft and the counter-shaft and the parts mounted thereon, said motor having an armature shaft axially alined with and drivably connected to said drive shaft, and said drive shaft being hollow and sleeved on the adjacent ends of the armature shaft and the final driven shaft.

11. A transmission comprising a counter-shaft having loosely mounted thereon large and small gears, a drive shaft having small and large gear devices meshing with and continuously driving respectively the large and small gears, one-way clutch means through which the large gear drives the counter-shaft during low speed drive and which releases the counter-shaft when the counter-shaft over-runs the large gear during high speed drive, said countershaft being provided with a part sleeved thereon and having a thread on which said small gear is mounted and also being provided between said gears with a clutch member engaged by said small gear by shifting it on said thread, a radially movable clutch element mounted in a slot in the counter-shaft and engageable with said threaded part, and an operating member movable lengthwise along the axis of the counter-shaft and having means to move the clutch element outward to cause the slowing up of the threaded part and consequent shifting of the small gear against the clutch member to give high speed drive, said transmission having a final driven shaft axially alined with said drive shaft and drivably connected to the counter-shaft through gear reduction means, in combination with a motor having a transmission housing secured to its end and serving with the end of the motor to house the drive shaft and the counter-shaft and the parts mounted thereon, said motor having an armature shaft axially alined with and drivably connected to said drive shaft, and said operating member projecting through the transmission housing from the end of the counter-shaft opposite said motor.

12. A transmission comprising a counter-shaft having loosely mounted thereon large and small gears, a drive shaft having small and large gear devices meshing with and continuously driving respectively the large and small gears, one-way clutch means through which the large gear drives the counter-shaft during low speed drive and which releases the counter-shaft when the counter-shaft over-runs the large gear during high speed drive, said countershaft being provided with a part sleeved thereon and having a thread on which said small gear is mounted and also being provided between said gears with a clutch member engaged by said small gear by shifting it on said thread, a radially movable clutch element mounted in a slot in the countershaft and engageable with said threaded part, and an operating member movable lengthwise along the axis of the counter-shaft and having means to move the clutch element outward to cause the slowing up of the threaded parts and consequent shifting of the small gear against the clutch member to give high speed drive, said transmission having a final driven shaft axially alined with said drive shaft and drivably connected to the counter-shaft through gear reduction means, in combination with a motor having a transmission housing secured to its end and serving with the end of the motor to house the drive shaft and the counter-shaft and the parts mounted thereon, said motor having an armature shaft axially alined with and drivably connected to said drive shaft, and said operating member projecting through the transmission housing from the end of the counter-shaft opposite said motor, together with a shift lever mounted on the transmission housing and operably engaging said operating member.

13. A transmission comprising a counter-shaft having loosely mounted thereon large and small gears, a drive shaft having small and large gear devices meshing with and continuously driving respectively the large and small gears, one-way clutch means through which the large gear drives the counter-shaft during low speed drive and which releases the counter-shaft when the counter-shaft over-runs the large gear during high speed drive, said countershaft being provided with a part sleeved thereon and having a thread on which said small gear is mounted and also being provided between said gears with a clutch member engaged by said small gear by shifting it on said thread, a radially movable clutch element mounted in a slot in the countershaft and engageable with said threaded part, and an operating member movable lengthwise along the axis of the counter-shaft and having means to move the clutch element outward to cause the slowing up of the threaded part and consequent shifting of the small gear against the clutch member to give high speed drive, said clutch element being of friction material and having frictional engagement with said threaded part.

14. A transmission comprising a counter-shaft having loosely mounted thereon large and small gears, a drive shaft having small and large gear devices meshing with and continuously driving respectively the large and small gears, one-way clutch means through which the large gear drives the counter-shaft during low speed drive and which releases the counter-shaft when the counter-shaft over-runs the large gear during high speed drive, said countershaft being provided with a part sleeved thereon and having a thread on which said small gear is mounted and also being provided between said gears with a clutch member engaged by said small gear by shifting it on said thread, a radially movable clutch element mounted in a slot in the counter-shaft and engageable with said threaded part, and an operating member movable lengthwise along the axis of the counter-shaft and having means to move the clutch element outward to cause the slowing up of the threaded part and consequent shifting of the small gear against the clutch member to give high speed drive, said clutch element being a key having positive engagement with said threaded part.

15. A transmission comprising a shaft having associated therewith two gears, means for continuously driving said gears at different speeds, a one-way drive connection between the slower gear and the shaft arranged to permit said shaft to overrun said slower gear when the shaft is being driven by the faster gear, a clutch member connected to the shaft, a clutch element shiftable transversely through said shaft, means rendered operative by said clutch element when so shifted to move the faster gear axially of the shaft into engagement with said clutch member for drivably connecting the faster gear to said shaft, and an operating device moveable axially of said shaft for shifting the clutch element.

16. A transmission comprising a shaft having associated therewith two gears, means for continuously driving said gears at different speeds, a one-way drive connection between the slower gear and the shaft arranged to permit said shaft to overrun said slower gear when the shaft is being driven by the faster gear, said shaft having a clutch part adjacent the faster gear and said faster gear having a cooperating clutch part, a member sleeved on said shaft and having threaded engagement with the faster gear, and means operable through said shaft for resisting angular movement of said member relatively to the shaft to cause movement of the faster gear axially of the shaft to bring said clutch parts into engagement.

17. A transmission comprising a shaft having associated therewith two gears, means for continuously driving said gears at different speeds, a one-way drive connection between the slower gear and the shaft arranged to permit said shaft to over-run said slower gear when the shaft is being driven by the faster gear, said shaft having a clutch part between said gears and said faster gear having a cooperating clutch part, and means operable to cause movement of the faster gear axially of the shaft to bring said clutch parts into engagement, said one-way drive connection and said last-named means comprising parts having respectively oppositely-directed threads to cause powerful clutch driving engagement with relatively light forces causing such engagement.

ADIEL Y. DODGE.